United States Patent
Hamaguchi et al.

(10) Patent No.: US 10,303,318 B2
(45) Date of Patent: May 28, 2019

(54) CAPACITANCE DETECTION METHOD, POSITION DETECTION METHOD, TOUCH PANEL CONTROLLER, AND ELECTRONIC DEVICE

(71) Applicant: SHARP KABUSHIKI KAISHA, Sakai, Osaka (JP)

(72) Inventors: Mutsumi Hamaguchi, Sakai (JP); Masayuki Miyamoto, Sakai (JP); Shinji Shinjo, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/764,430

(22) PCT Filed: Sep. 8, 2016

(86) PCT No.: PCT/JP2016/076404
§ 371 (c)(1),
(2) Date: Mar. 29, 2018

(87) PCT Pub. No.: WO2017/056900
PCT Pub. Date: Apr. 6, 2017

(65) Prior Publication Data
US 2018/0275793 A1    Sep. 27, 2018

(30) Foreign Application Priority Data
Oct. 1, 2015 (JP) ................... 2015-196144

(51) Int. Cl.
*G06F 3/041* (2006.01)
*G06F 3/044* (2006.01)

(52) U.S. Cl.
CPC ............ *G06F 3/044* (2013.01); *G06F 3/0416* (2013.01)

(58) Field of Classification Search
CPC .............................. G06F 3/0416; G06F 3/044
See application file for complete search history.

(56) References Cited

U.S. PATENT DOCUMENTS

| | | | | |
|---|---|---|---|---|
| 2010/0013791 A1* | 1/2010 | Haga | ...................... | G06F 3/0412 345/174 |
| 2014/0204053 A1* | 7/2014 | Crandall | .................. | G06F 3/044 345/174 |
| 2016/0117054 A1* | 4/2016 | Mamba | .................. | G06F 3/0418 345/174 |

FOREIGN PATENT DOCUMENTS

JP        2015-032234 A        2/2015

\* cited by examiner

*Primary Examiner* — Muhammad N Edun
(74) *Attorney, Agent, or Firm* — .ScienBiziP, P.C.

(57) ABSTRACT

Capacitance distribution on a touch panel is detected with a simple configuration. A drive switch element between each of electrodes and a corresponding drive line is made to turn on and the drive line is driven on the basis of a code sequence. A sense switch element between each of the electrodes and a corresponding sense line is made to turn on and a linear sum signal of each of the electrodes is read along the sense line.

9 Claims, 9 Drawing Sheets

| | phase0 | phase1 |
|---|---|---|
| AFE0 | S1 – S0 | S2 – S1 |
| AFE1 | S3 – S2 | S4 – S3 |
| AFE2 | S5 – S4 | S6 – S5 |
| AFE3 | S7 – S6 | S8 – S7 |
| AFE4 | S9 – S8 | S10 – S9 |
| AFE5 | S11 – S10 | S12 – S11 |
| AFE6 | S13 – S12 | S14 – S13 |
| AFE7 | S15 – S14 | S16 – S15 |
| AFE8 | S17 – S16 | S18 – S17 |
| AFE9 | S19 – S18 | S20 – S19 |
| AFE10 | S21 – S20 | S22 – S21 |
| AFE11 | S23 – S22 | S24 – S23 |
| AFE12 | S25 – S24 | S26 – S25 |
| AFE13 | S27 – S26 | S28 – S27 |
| AFE14 | S29 – S28 | S30 – S29 |
| AFE15 | S31 – S30 | |

FIG. 3B

| | phase0 | phase1 |
|---|---|---|
| AFE0 | S2 – S0 | S4 – S2 |
| AFE1 | S3 – S1 | S5 – S3 |
| AFE2 | S6 – S4 | S8 – S6 |
| AFE3 | S7 – S5 | S9 – S7 |
| AFE4 | S10 – S8 | S12 – S10 |
| AFE5 | S11 – S9 | S13 – S11 |
| AFE6 | S14 – S12 | S16 – S14 |
| AFE7 | S15 – S13 | S17 – S15 |
| AFE8 | S18 – S16 | S20 – S18 |
| AFE9 | S19 – S17 | S21 – S19 |
| AFE10 | S22 – S20 | S24 – S22 |
| AFE11 | S23 – S21 | S25 – S23 |
| AFE12 | S26 – S24 | S28 – S26 |
| AFE13 | S27 – S25 | S29 – S27 |
| AFE14 | S30 – S28 | |
| AFE15 | S31 – S29 | |

FIG. 3C

| | phase0 | phase1 |
|---|---|---|
| AFE0 | S4 – S0 | S8 – S4 |
| AFE1 | S5 – S1 | S9 – S5 |
| AFE2 | S6 – S2 | S10 – S6 |
| AFE3 | S7 – S3 | S11 – S7 |
| AFE4 | S12 – S8 | S16 – S12 |
| AFE5 | S13 – S9 | S17 – S13 |
| AFE6 | S14 – S10 | S18 – S14 |
| AFE7 | S15 – S11 | S19 – S15 |
| AFE8 | S20 – S16 | S24 – S20 |
| AFE9 | S21 – S17 | S25 – S21 |
| AFE10 | S22 – S18 | S26 – S22 |
| AFE11 | S23 – S19 | S27 – S23 |
| AFE12 | S28 – S24 | |
| AFE13 | S29 – S25 | |
| AFE14 | S30 – S26 | |
| AFE15 | S31 – S27 | |

| | phase0 | phase1 |
|---|---|---|
| AFE0 | ( S3+S2 ) − ( S1+S0 ) | ( S5+S4 ) − ( S3+S2 ) |
| AFE1 | ( S7+S6 ) − ( S5+S4 ) | ( S9+S8 ) − ( S7+S6 ) |
| AFE2 | (S11+S10) − ( S9+S8 ) | (S13+S12) − (S11+S10) |
| AFE3 | (S15+S14) − (S13+S12) | (S17+S16) − (S15+S14) |
| AFE4 | (S19+S18) − (S17+S16) | (S21+S20) − (S19+S18) |
| AFE5 | (S23+S22) − (S21+S20) | (S25+S24) − (S23+S22) |
| AFE6 | (S27+S26) − (S25+S24) | (S29+S28) − (S27+S26) |
| AFE7 | (S31+S30) − (S29+S28) | |

FIG. 7

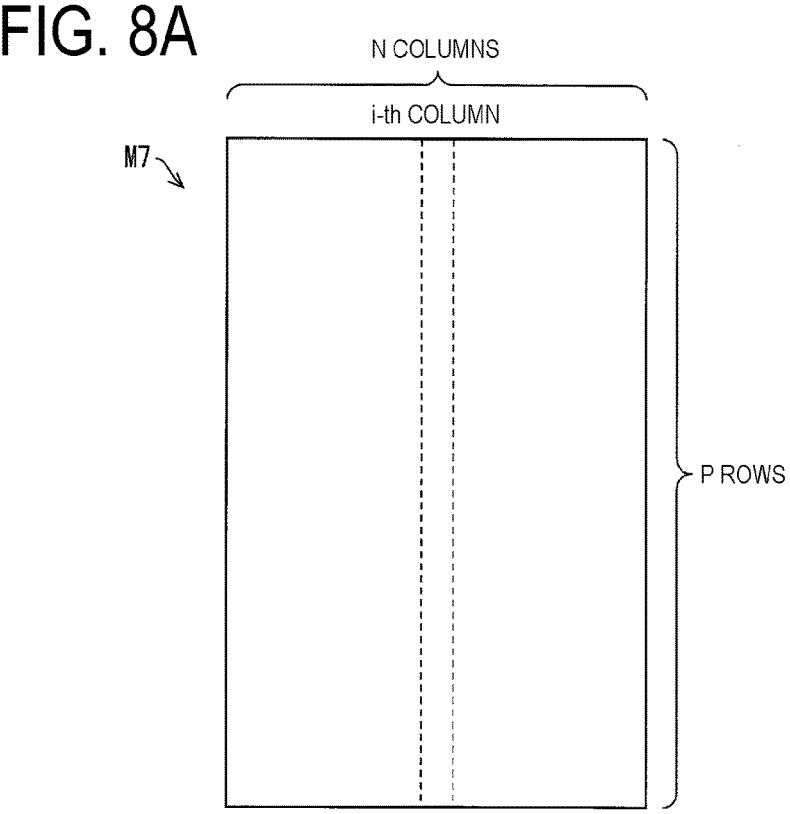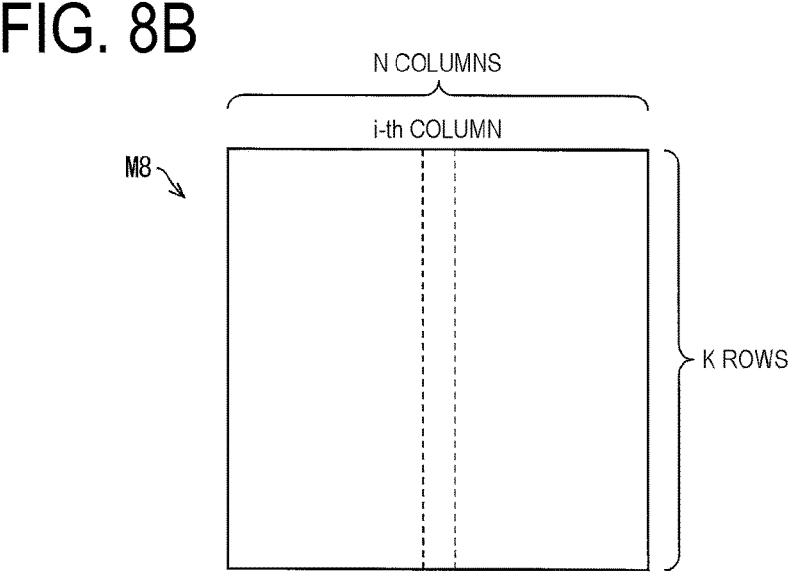

CAPACITANCE DETECTION METHOD, POSITION DETECTION METHOD, TOUCH PANEL CONTROLLER, AND ELECTRONIC DEVICE

TECHNICAL FIELD

The disclosure relates to a capacitance detection method using a touch panel that detects a capacitance or a change in capacitance between each of a plurality of electrodes and a detected subject, a position detection method, a touch panel controller, and an electronic device.

BACKGROUND ART

PTL 1 discloses a capacitance detection method using a touch panel that detects a capacitance or a change in capacitance between each of a plurality of electrodes and a detected subject.

FIG. 10 is a circuit diagram illustrating a configuration of a touch panel system in the related art. A touch panel 92 includes 12 detection electrodes E arranged in four rows and three columns in matrix with an interval between each other. A sense line S coupled to each of the detection electrodes E is connected to a read circuit 95.

In a capacitance detection method using the touch panel 92 formed as described above, a signal corresponding to an electrostatic capacity between each of the detection electrodes E and a detected subject passes through the corresponding sense line S and is read by the read circuit 95. Then, distribution of the electrostatic capacity or a change in electrostatic capacity on the touch panel 92 is detected.

CITATION LIST

Patent Literature

PTL 1: JP 2015-32234 A (published Feb. 16, 2015).

SUMMARY

Technical Problem

However, the above-mentioned related art illustrated in FIG. 10 needs to install the sense line S from each of all the detection electrodes E of the touch panel 92 to the read circuit 95 in order to detect distribution of an electrostatic capacity or a change in electrostatic capacity on the touch panel 92. Thus, for increasing the size of the touch panel, a wiring resistance of the sense line S increases, and the number of channels (the number of sense lines S) of the read circuit 95 increases in proportion to a result of multiplying the number of rows by the number of columns of the detection electrodes E. This leads to a complicated configuration of a touch panel system.

An object of the disclosure is to provide a capacitance detection method capable of detecting capacitance distribution between each of detection electrodes and a detected subject on a touch panel with a simple configuration, a position detection method, a touch panel controller, and an electronic device.

Solution to Problem

To address the above-described issue, a capacitance detection method according to one aspect of the disclosure is a capacitance detection method for detecting a capacitance or a change in capacitance between a plurality of electrodes and a detected subject, the plurality of electrodes located corresponding to intersections of a plurality of first and second signal lines intersecting each other. The capacitance detection method includes: a driving step of turning on a first switch element between each of the plurality of electrodes and at least two of the plurality of first signal lines, and driving the plurality of first signal lines, based on a code sequence; a reading step of turning on a second switch element between each of the plurality of electrodes and a corresponding second signal line, and reading a linear sum signal based on an electric charge of each of the plurality of electrodes along the second signal line; and a detecting step of detecting the capacitance or the change in capacitance by inner product computation performed on the linear sum signal and the code sequence.

To solve the above-described problems, a position detection method according to one aspect of the disclosure is a position detection method for detecting, on a touch panel configured to detect a capacitance or a change in capacitance between each of a plurality of electrodes and a detected subject, a position of the detected subject, the plurality of electrodes located corresponding to intersections of a plurality of first signal lines and a plurality of second signal lines intersecting each other. The position detection method includes: the capacitance detection method according to the disclosure; and a position detection step of detecting a position of the detected subject on the touch panel, based on the capacitance or the change in capacitance that has been detected in the detecting step.

To address the above-described problems, a touch panel controller according to one aspect of the disclosure is a touch panel controller configured to control a touch panel configured to detect a capacitance or a change in capacitance between a plurality of electrodes and a detected subject, the plurality of electrodes located corresponding to intersections of a plurality of first signal lines and a plurality of second signal lines intersecting each other. The touch panel controller includes: a drive circuit configured to turn on a first switch element between the plurality of electrodes and a corresponding first signal line, and to drive the plurality of first signal lines, based on a code sequence; a read circuit configured to turn on a second switch element between the plurality of electrodes and a corresponding second signal line, and to read a linear sum signal based on an electric charge of each of the plurality of electrodes along the second signal line; and a detection circuit configured to detect the capacitance or the change in capacitance by inner product computation of the linear sum signal and the code sequence.

To solve the above-described problems, an electronic device according to one aspect of the disclosure includes the touch panel controller according to the disclosure.

Advantageous Effects of Invention

According to one aspect of the disclosure, an effect capable of detecting capacitance distribution between each of detection electrodes and a detected subject on a touch panel with a simple configuration is achieved.

BRIEF DESCRIPTION OF DRAWINGS

FIG. 2 illustrates an example of a drive code of a drive circuit of a touch panel controller provided in the touch panel system. FIG. 2A illustrates an example of a drive code driving at two values of +1/−1 and a decoding code. FIG. 2B illustrates an example of a drive code driving at only +1 and a decoding code.

FIG. 3 is a diagram for describing a method for reading a difference between a linear sum signal along one of sense lines of a touch panel provided in the touch panel system and a linear sum signal along another one of the sense lines. FIG. 3A illustrates an example of reading a difference between the sense lines adjacent to each other (next to each other). FIG. 3B illustrates an example of reading a difference between the sense lines with one line therebetween. FIG. 3C illustrates an example of reading a difference between the sense lines with three lines therebetween.

FIG. 7 is a diagram illustrating an example of a drive code of a drive circuit of a touch panel controller provided in e touch panel system.

FIGS. 8A and 8B are diagrams illustrating an example of another drive code of the drive circuit.

DESCRIPTION OF EMBODIMENTS

A detailed description follows regarding embodiments of the disclosure.

First Embodiment

Configuration of Touch Panel System 1

Figure 1:
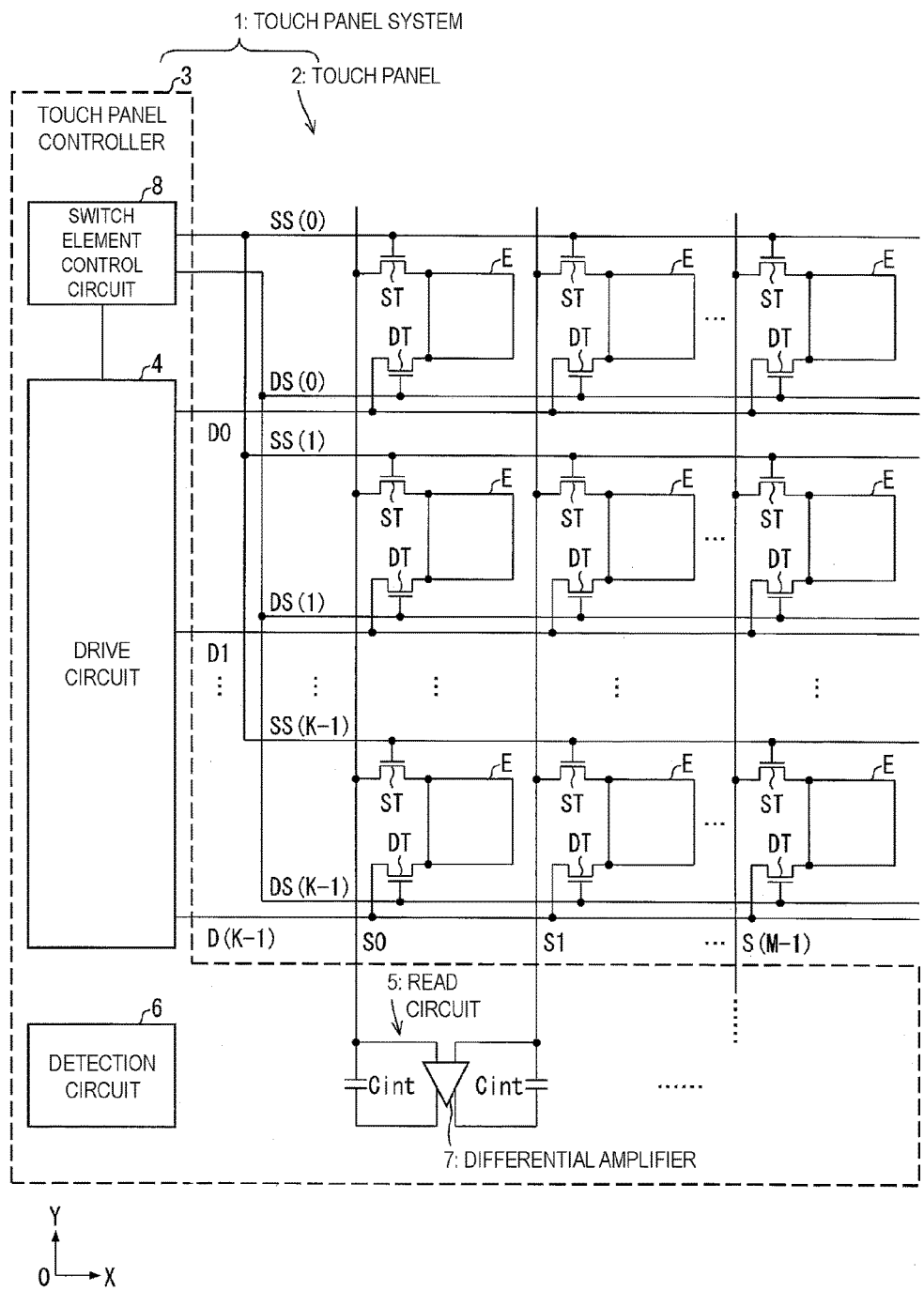
FIG. 1 is a circuit diagram illustrating a configuration of a touch panel system according to a first embodiment.

FIG. 1 is a circuit diagram illustrating a configuration of a touch panel system 1 according to a first embodiment. The touch panel system 1 includes a touch panel 2 and a touch panel controller 3 that controls the touch panel 2.

The touch panel 2 includes K (where K is plural) drive lines D0 to D(K−1) (first signal lines) and M (where M is plural) sense lines S0 to S(M−1) (second signal lines) intersecting each other. The touch panel 2 also includes (K×M) detection electrodes E (electrodes) that correspond to intersections of the K drive lines D0 to D(K−1) and the M sense lines S0 to S(M−1) and that are arranged in matrix.

In the touch panel 2, K drive control lines DS0 to DS(K−1) and K sense control lines SS0 to SS(K−1) are disposed so as to correspond to the drive lines D to D(K−1). A drive switch element DT (first switch element) is formed between each of the detection electrodes E and the corresponding drive line. A sense switch element ST (second switch element) is formed between each of the detection electrodes E and the corresponding sense line. The drive switch element DT and the sense switch element ST are each formed of a transistor. A gate of each of the drive switch elements DT is coupled to the corresponding drive control line. A gate of each of the sense switch elements ST is coupled to the corresponding sense control line.

The touch panel 2 is provided for detecting a capacitance or a change in capacitance between each of the detection electrodes E and a detected subject such as a finger and a pen.

The touch panel controller 3 includes a drive circuit 4 connected to the K drive lines D0 to D(K−1), a switch element control circuit 8 connected to the K drive control lines DS0 to DS(K−1) and the K sense control lines SS0 to SS(K−1), a plurality of read circuits 5 connected to the sense lines adjacent to each other, and a detection circuit 6 that detects a capacitance or a change in capacitance between each of the detection electrodes E and the detected subject on the basis of an output of each of the read circuits 5.

Each of the read circuits 5 includes a differential amplifier 7 that amplifies a difference between outputs of the sense lines adjacent to each other and a pair of integral capacitances Cint provided between one input and one output of the differential amplifier 7 and between another input and another output thereof. Note that each of the read circuits 5 may include a switch (not illustrated) that short-circuits one terminal and the other terminal of the integral capacitances Cint and resets a state of the differential amplifier 7.

Action of Touch Panel System 1

The touch panel system 1 formed as described above works as follows.

First, the switch element control circuit 8 turns on the (K×M) drive switch elements DT via the K drive control lines DS0 to DS(K−1) and turns off the (K×M) sense switch elements ST via the K sense control lines SS0 to SS(K−1). The drive circuit 4 then drives the K drive lines D0 to D(K−1) on the basis of a code sequence of N rows and K columns, and charges or discharges each of the detection electrodes E with or to, for example, a power source voltage or a ground potential through each of the drive switch elements DT.

Next, the switch element control circuit 8 turns off the (K×M) drive switch elements DT via the K drive control lines DS0 to DS(K−1) and brings each of the detection electrodes E into a floating state. Subsequently, the switch element control circuit 8 turns on the (K×M) sense switch elements ST via the K sense control lines SS0 to SS(K−1).

Each of the read circuits 5 amplifies a difference between linear sum signals based on an electric charge of each of the detection electrodes E read along the adjacent sense line via the sense switch element ST turning on. Next, the detection circuit 6 detects a capacitance or a change in capacitance between each of the detection electrodes E of the touch panel 2 and a detected subject on the basis of an inner product computation performed on the difference between the linear sum signals output from each of the read circuits 5 and the code sequence. Subsequently, the detection circuit 6 detects a position of the detected subject on the touch panel 2 on the basis of the detected capacitance or the detected change in capacitance.

Figure 10:
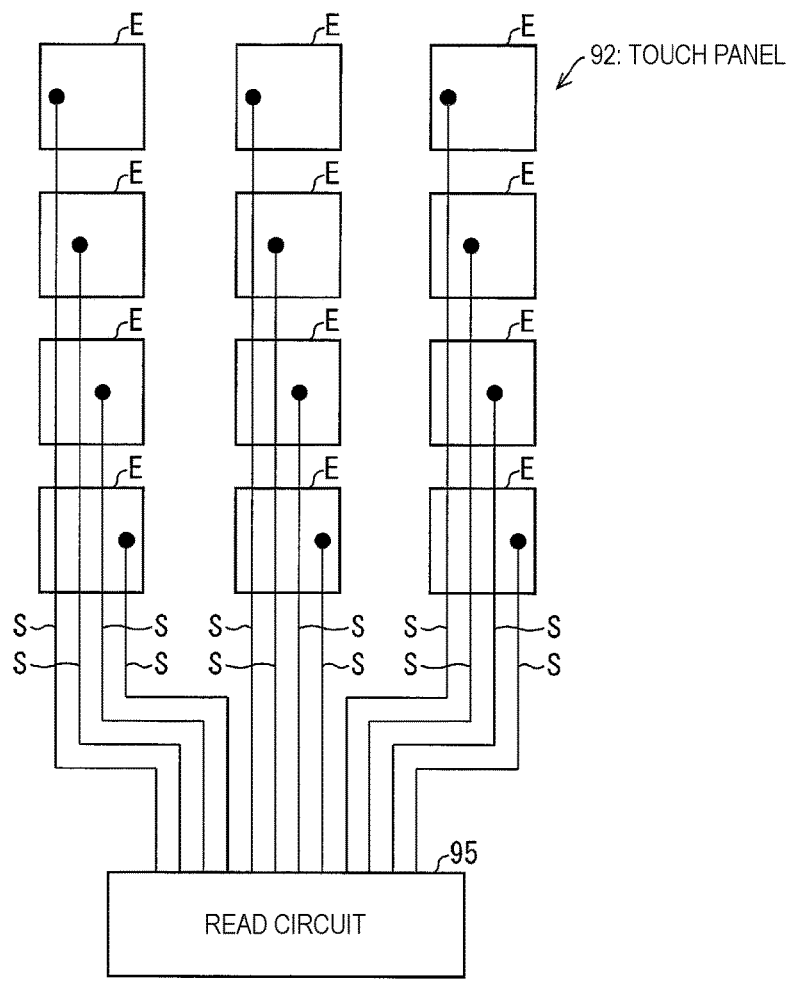
FIG. 10 is a circuit diagram illustrating a configuration of a touch panel system in the related art.

In the above-described touch panel 92 in the related art with reference to FIG. 10, the number of channels (the number of sense lines S) of the read circuit 95 is massive, so that in sequential drive, the greater number of sense lines S increases time required for scanning or the same scanning time reduces the number sense lines S that can be scanned. However, when the touch panel 2 in which each of the detection electrodes E is provided with the drive switch element DT and the sense switch element ST as in the first embodiment is driven in parallel, the touch panel can be scanned in a short time with a simple configuration.

In a case where the touch panel 2 is driven in parallel, it is also more advantageous in terms of an S/N ratio than the sequential drive.

In recent times, a reduction in size of a liquid crystal module typified by a structure, which is called in-cell, including a sensor of a touch panel formed inside a display panel has been advancing, and a distance between a liquid crystal panel and the touch panel has been reduced. Thus, an influence of noise by the touch panel on the liquid crystal panel has not been negligible, and a need to drive the touch panel and the liquid crystal panel in a time-division manner has been increasing. Consequently, drive time assigned to the touch panel is limited, so that driving the touch panel in parallel is more advantageous than the sequential drive.

For the in-cell, the touch panel and the liquid crystal panel are integrally produced in the step of producing the liquid crystal panel, and thus the drive switch element DT and the sense switch element ST of the touch panel 2 are easily installed in the touch panel 2. In other words, the transistor forming the drive switch element DT and the sense switch element ST can be produced with the same mask as a mask for the liquid crystal panel, so that an increase in cost of an initial investment is reduced even in a case where the drive switch element DT and the sense switch element ST are provided in the touch panel.

Furthermore, the plurality of detection electrodes E arranged in matrix in the touch panel 2 may also be used as common electrodes of the liquid crystal panel. When the touch panel and the liquid crystal panel are driven in the time division manner, a voltage for driving the touch panel is applied to the plurality of detection electrodes E in a drive period assigned to the touch panel, and the plurality of detection electrodes E function as electrodes for driving the liquid crystal panel in a drive period assigned to the liquid crystal panel.

Specific Example of Code Sequence

Figures 2A, 2B:
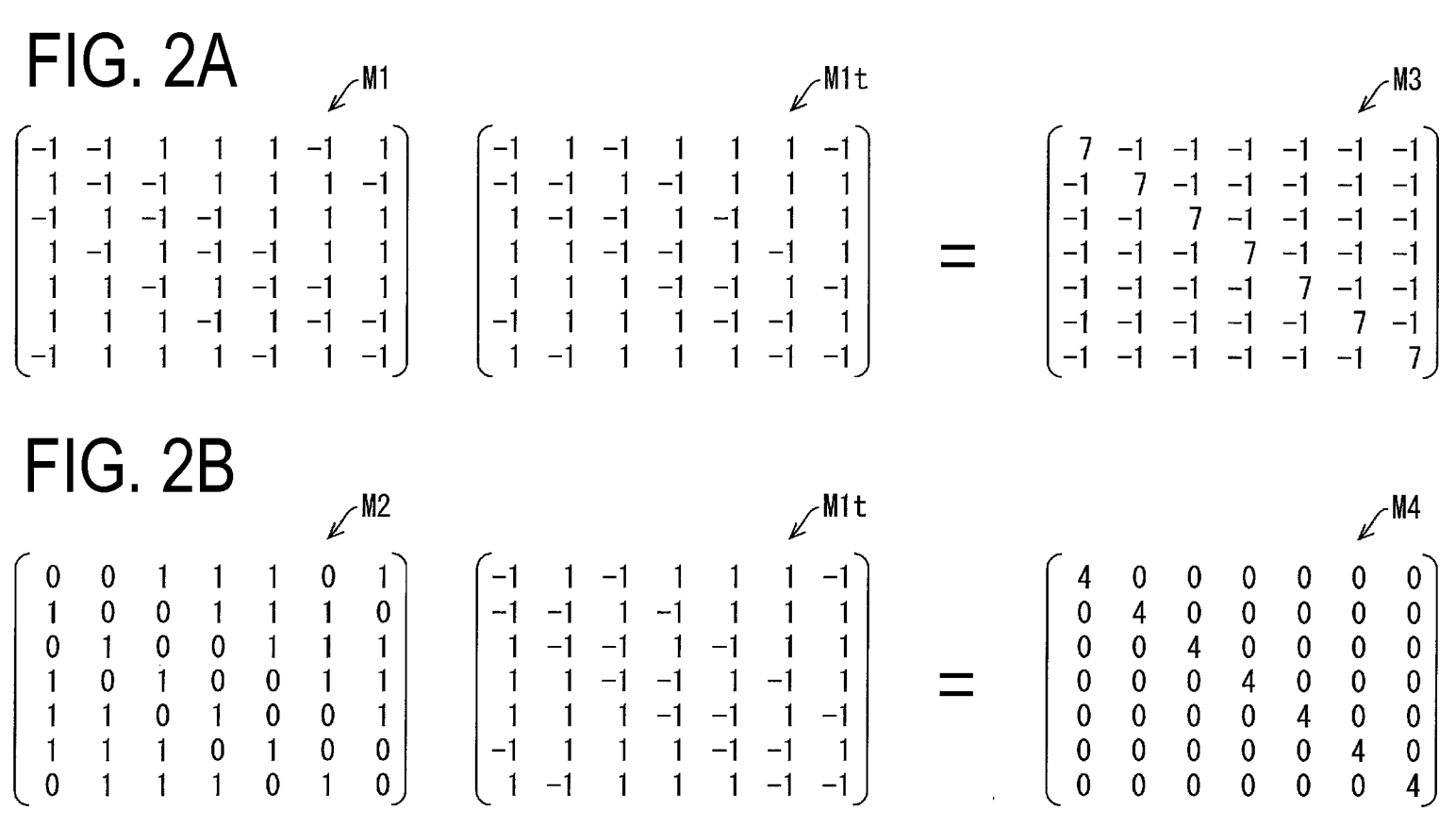

FIG. 2 illustrates an example of a drive code (code sequence) of the drive circuit 4 of the touch panel controller 3 provided in the touch panel system 1. FIG. 2A illustrates an example of a drive code driving at two values of +1/−1 and a decoding code. FIG. 2B illustrates an example of a drive code driving at only +1 and a decoding code.

With reference to FIG. 2A, a code sequence M1 of an M sequence for driving seven drive lines D0 to D6 at two values of "+1" and "−1" by the drive circuit 4, a code sequence M1t used for an inner product calculation with a linear sum signal for decoding in the detection circuit 6 and formed by transposing the code sequence M1, and a code sequence M3 being a result of the inner product calculation performed on the code sequence M1 and the code sequence M1t are illustrated.

With reference to FIG. 2B, a code sequence M2 for driving the drive lines D0 to D6 at only "+1" by the drive circuit 4, the code sequence M1t used for an inner product calculation with a linear sum signal for decoding in the detection circuit 6 and formed by transposing the code sequence M1, and a code sequence M4 being a result of the inner product calculation performed on the code sequence M2 and the code sequence M1t are illustrated.

Specific Example of Differential Reading

FIG. 3 is a diagram for describing a method for reading a difference between a linear sum signal along one of the sense lines of the touch panel 2 provided in the touch panel system 1 and a linear sum signal along another one of the sense lines. FIG. 3A illustrates an example of reading a difference between the sense lines adjacent to each other (next to each other). FIG. 3B illustrates an example of reading a difference between the sense lines with one line therebetween. FIG. 3C illustrates an example of reading a difference between the sense lines with three lines therebetween.

With reference to FIG. 3A, an example of reading 32 sense lines S0 to S31 by 16 read circuits AFE0 to AFE15 is illustrated. The read circuits AFE0 to AFE15 each have the same configuration as that of the read circuit 5.

First, at a timing phase 0, the read circuit AFE0 amplifies a difference between a linear sum signal from the sense line S1 and a linear sum signal from the sense line S0. Then, the read circuit AFE1 amplifies a difference between the sense line S3 and the sense line S2, and the read circuit AFE2 amplifies a difference between the sense line S5 and the sense line S4. Hereinafter, the read circuits AFE3 to AFE15 similarly amplify a difference between the adjacent sense lines.

At a next timing phase 1, the read circuit AFE0 amplifies a difference between the sense line S2 and the sense line S1. Then, the read circuit AFE1 amplifies a difference between the sense line S4 and the sense line S3, and the read circuit AFE2 amplifies a difference between the sense line S6 and the sense line S5. Hereinafter, the read circuits AFE3 to AFE14 similarly amplify a difference between the adjacent sense lines.

In the example illustrated in FIGS. 1 and 3A, the example in which e read circuit differentially amplifies the adjacent sense lines is illustrated. However, the disclosure is not limited thereto. The sense lines that are not adjacent to each other with a plurality of lines therebetween may be differentially amplified.

FIG. 3B illustrates an example of reading a difference between the sense lines with one line therebetween.

First, at a timing phase 0, the read circuit AFE0 amplifies a difference between the sense line S2 and the sense line S0. Then, the read circuit AFE1 amplifies a difference between the sense line S3 and the sense line S1, and the read circuit AFE2 amplifies a difference between the sense line S6 and the sense line S4. Hereinafter, the read circuits AFE3 to AFE15 similarly amplify a difference between the sense lines with one line therebetween.

At a next timing phase 1, the read circuit AFE0 amplifies a difference between the sense line S4 and the sense line S2. Then, the read circuit AFE1 amplifies a difference between the sense line S5 and the sense line S3, and the read circuit AFE2 amplifies a difference between the sense line S8 and the sense line S6. Hereinafter, the read circuits AFE3 to AFE13 similarly amplify a difference between the sense lines with one line therebetween.

FIG. 3C illustrates an example of reading a difference between the sense lines with three lines therebetween.

First, at a timing phase 0, the read circuit AFE0 amplifies a difference between the sense line S4 and the sense line S0. Then, the read circuit AFE1 amplifies a difference between the sense line S5 and the sense line S1, and the read circuit AFE2 amplifies a difference between the sense line S6 and the sense line S2. Hereinafter, the read circuits AFE3 to AFE15 similarly amplify a difference between the sense lines with three lines therebetween.

At a next timing phase 1, the read circuit AFE0 amplifies a difference between the sense line S8 and the sense line S4. Then, the read circuit AFE1 amplifies a difference between the sense line S9 and the sense line S5, and the read circuit AFE2 amplifies a difference between the sense line S10 and the sense line S6. Hereinafter, the read circuits AFE3 to AFE11 similarly amplify a difference between the sense lines with three lines therebetween.

Such differential reading that reads a difference between the sense lines allows noise on one of the sense lines and noise on the other sense line to cancel each other by subtraction, so that the touch panel system resistant to noise can be formed.

A difference is read between the sense lines in the differential reading, which results in a decreased value of a read signal. Thus, the differential reading is advantageous in that a gain of the differential amplifier 7 can be increased more than a gain in a case of single reading.

Figures 4, 5:
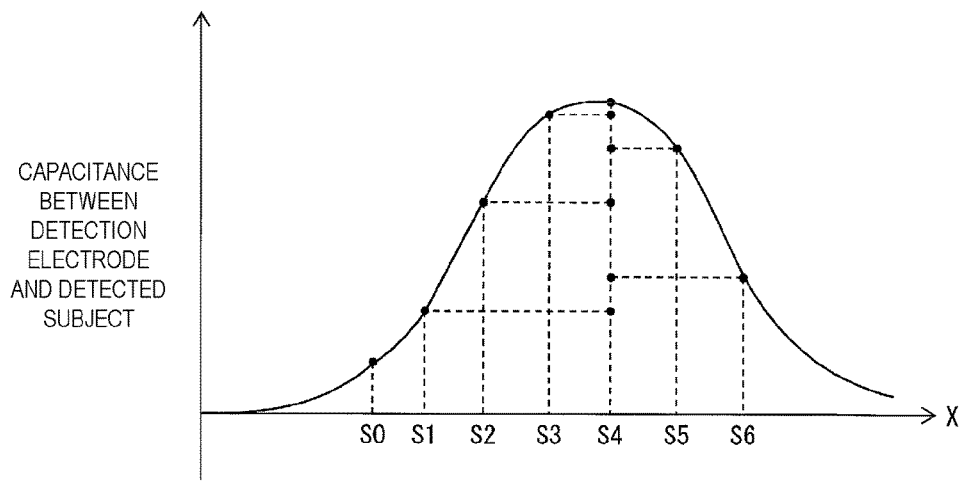
FIG. 4 is a graph showing capacitance distribution between a detection electrode corresponding to each of the sense lines and a detected subject.
FIG. 5 is a diagram for describing a method for reading a difference between a linear sum signal based on a group including the plurality of sense lines and another linear sum signal based on another group including the other plurality of sense lines.

FIG. 4 is a graph showing capacitance distribution between the detection electrode corresponding to each of the sense lines and a detected subject.

In a hover operation operated by a detected subject such as a finger slightly away from the touch panel 2, distribution of a capacitance between the detection electrode E and the detected subject in a plane direction of the touch panel 2 is distribution as illustrated in FIG. 4.

A signal in which a difference between linear sum signals from the adjacent sense tines is amplified has a small value, but an obtained value of the differential signal can be increased as illustrated in FIG. 4 by positioning the sense lines having a difference amplified away from each other as illustrated in FIGS. 3B and 3C.

FIG. 5 is a diagram for describing a method for reading a difference between a linear sum signal based on a group including the plurality of sense lines and another linear sum signal based on another group including the other plurality of sense lines.

The above-mentioned embodiment, illustrates the example of reading a difference between the linear sum signal along one of the sense lines and the other linear sum signal along the other sense line. However, the disclosure is not limited thereto. A difference may be read between a linear sum signal based on a group including the plurality of sense lines and another linear sum signal based on another group including the other plurality of sense lines.

FIG. 5 illustrates an example of making a group of a (2n)-th sense line and a (2n+1)-th sense line and reading a difference between grouped sense line groups.

First, at a timing phase 0, the sense lines S3 and S2 are formed into a group, and the sense lines S1 and S0 are formed into a group. Then, the read circuit AFE0 amplifies a difference between a sum of a linear sum signal from the sense line S3 and a linear sum signal from the sense line S2 and a sum of a linear sum signal from the sense line S1 and a linear sum signal from the sense line S0. The sense lines S7 and S6 are formed into a group, and the sense lines S5 and S4 are formed into a group. Then, the read circuit AFE1 amplifies a difference between a sum of a linear sum signal from the sense line S7 and a linear sum signal from the sense line S6 and a sum of a linear sum signal from the sense line S5 and a linear sum signal from the sense line S4. The sense lines S11 and S10 are formed into a group, and the sense lines S9 and S8 are formed into a group. Then, the read circuit AFE2 amplifies a difference between a sum of the sense line S11 and the sense line S10 and a sum of the sense line S9 and the sense line S8. Hereinafter, the read circuits AFE3 to AFE7 similarly amplify a difference between the grouped sense line groups.

At a next timing phase 1, the sense lines S5 and S4 are formed into a group, and the sense lines S3 and S2 are formed into a group. Then, the read circuit AFE0 amplifies a difference between a sum of a linear sum signal from the sense line S5 and a linear sum signal from the sense line S4 and a sum of a linear sum signal from the sense line S3 and a linear sum signal from the sense line S2. The sense lines S9 and S8 are formed into a group, and the sense lines S7 and S6 are formed into a group. Then, the read circuit AFE1 amplifies a difference between a sum of a linear sum signal from the sense line S9 and a linear sum signal from the sense line S8 and a sum of a linear sum signal from the sense line S7 and a linear sum signal from the sense line S6. The sense lines S13 and S12 are formed into a group, and the sense lines S11 and S10 are formed into a group. Then, the read circuit AFE2 amplifies a difference between a sum of the sense line S13 and the sense line S12 and a sum of the sense line S11 and the sense line S10. Hereinafter, the read circuits AFE3 to AFE6 similarly amplify a difference between the grouped sense line groups.

The differential reading reads a difference component between the sense lines, so that only a small signal can be acquired. However, as described above, the sense lines are brought together into a group and then read, so that a signal component read from the sense lines can be increased.

Note that in the above-described embodiments, examples of turning on the drive switch elements DT to drive all the drive lines D0 to D(K 1) have been illustrated, but the disclosure is not limited to the above-described embodiments. The switch element control circuit 8 and the drive circuit 4 may be configured to turn on the drive switch elements DT to drive at least two of the drive lines.

Second Embodiment

Figure 6:
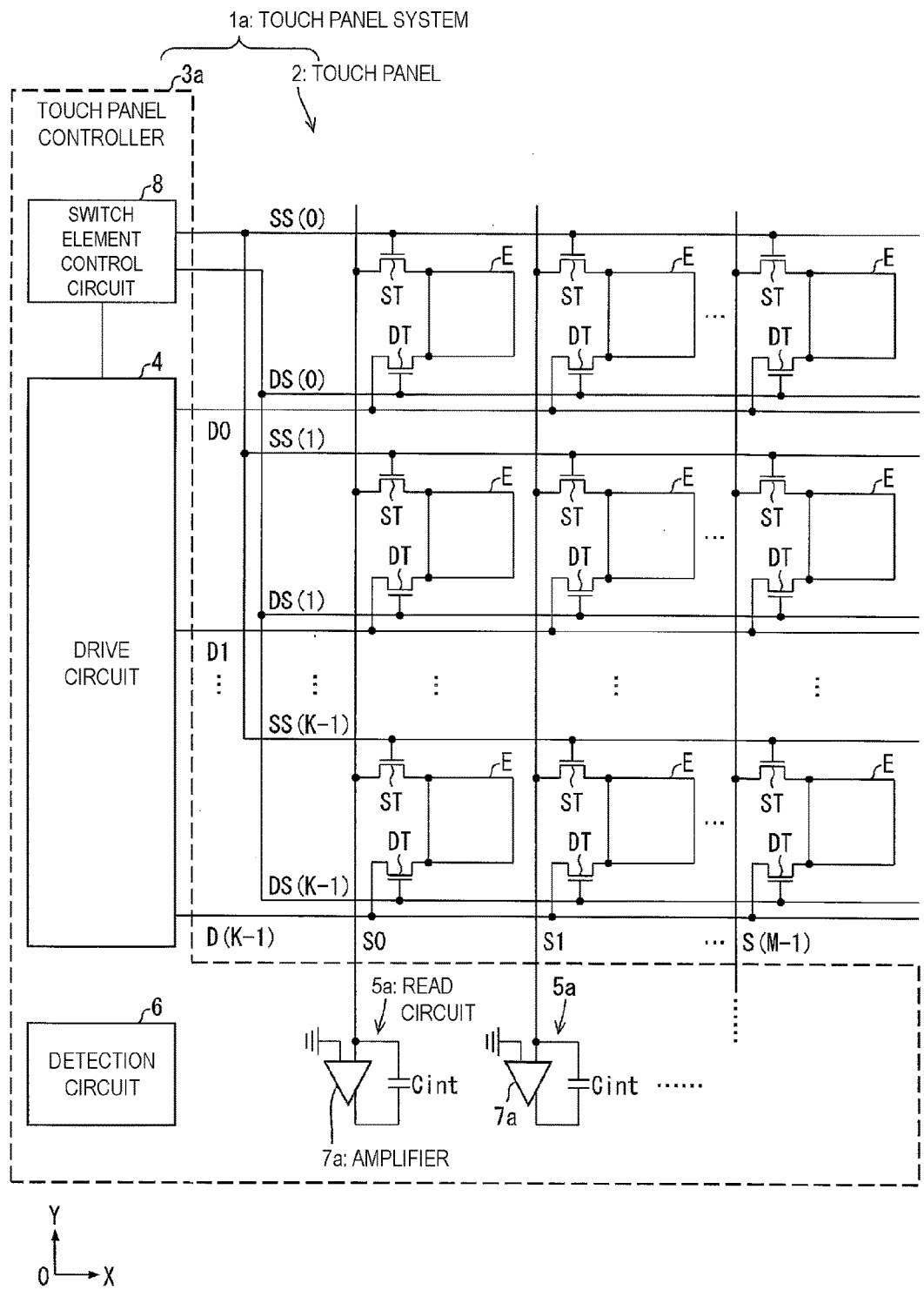
FIG. 6 is a circuit diagram illustrating a configuration of a touch panel system according to a second embodiment.
Figure 7:
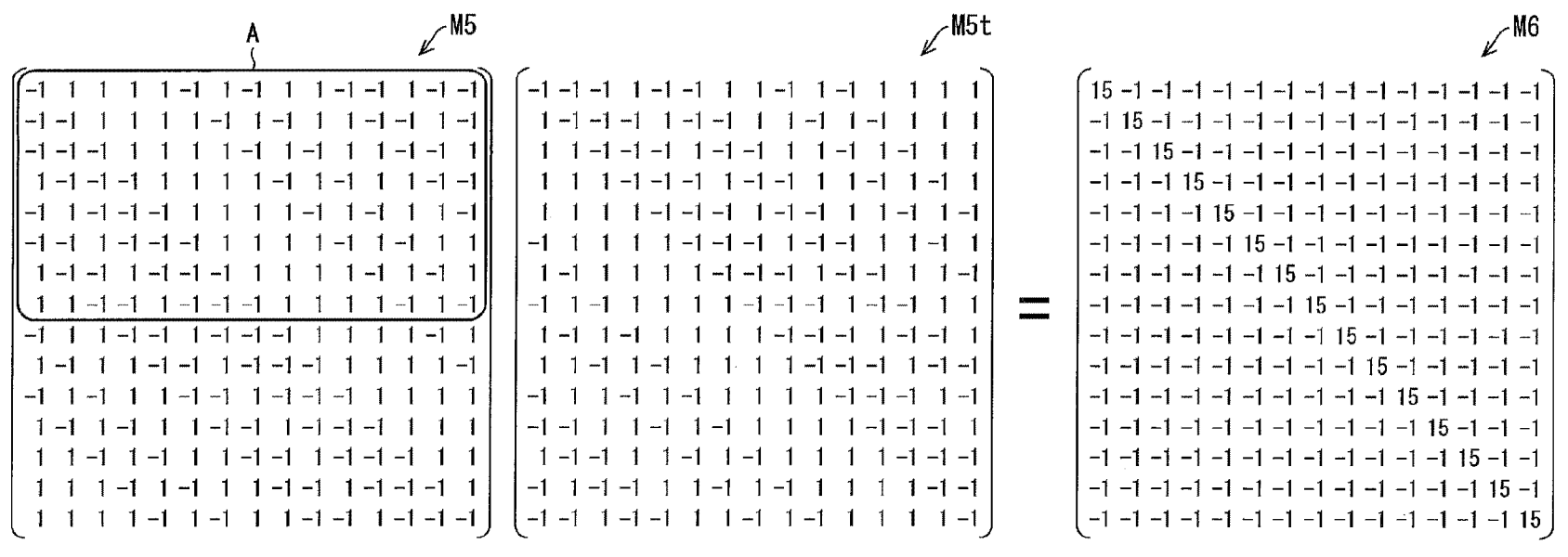

A description follows regarding another embodiment of the disclosure, with reference to FIGS. 6 to 8. Note that members having the same function as the members stated in the embodiment above are appended with the same reference signs for the sake of description, and the description thereof is omitted.

FIG. 6 is a circuit diagram illustrating a configuration of a touch panel system 1a according to a second embodiment. The touch panel system 1a performs single reading on a sense line.

The touch panel system 1a includes a touch panel 2 and a touch panel controller 3a that controls the touch panel 2. The touch panel controller 3a includes M read circuits 5a. Each of M sense lines S0 to S(M−1) is connected to one of inputs of an amplifier 7a of the corresponding read circuit 5a. Another input of the amplifier 7a is AC grounded. An integral capacitance Cint is connected between the one input and an output of the amplifier 7a. Note that each of the read circuits 5a may include a switch (not illustrated) that short-circuits one terminal and the other terminal of the integral capacitances Cint and resets a state of the amplifier 7a.

The single reading reads an absolute value of a capacitance instead of a difference component of a capacitance. Thus, the single reading is advantageous in that a value of a signal is greater than that in the differential reading, but the amplifier is more likely to be saturated.

FIG. 7 is a diagram illustrating an example of a drive code (code sequence) of a drive circuit 4 of the touch panel controller 3a provided in the touch panel system 1a.

FIG. 7 illustrates a code sequence M5 of 15 rows and 15 columns of an M sequence when driving at two values of a factor "+1" for allowing the drive circuit 4 to drive the drive line from a reference potential to a power source potential (first potential) and a factor "−1" for allowing the drive circuit 4 to drive the drive line from a reference potential to a ground potential (second potential), a code sequence M5t used for an inner product calculation for decoding in a detection circuit 6 and formed by transposing the code sequence M5, and a code sequence M6 being a result of the inner product calculation of the code sequence M5 and the code sequence M5$t$.

Eight drive lines are driven on the basis of a code sequence A of eight rows and 15 columns surrounded by a frame illustrated in FIG. 7 in the code sequence M5.

The number of factors "1" is three and the number of factors "−1" is five in a first column from the left in the code sequence A, and thus a difference between them in number is two. The number of factors "1" is three and the number of factors "−1" is five in a second column to a third column similarly from the left, and thus a difference between them in number is two. The number of factors "1" is four and the number of factors "−1" is four in a fourth column from the left, and thus there is no difference between them in number. The number of factors "1" is six and the number of factors "−1" is two in a ninth column to a tenth column from the left, and thus a difference between them in number is four.

In this way, a difference between the number of factors "1" and the number of factors "−1" in each of the columns in the code sequence A varies from zero to four and is unbalanced.

On the other hand, in the code sequence M1 of the M sequence of seven rows and seven columns described above with FIG. 2A, the number of factors "1" is four and the number of factors "−1" is three in each of the first column to the seventh column, and thus a difference between them in number is one. Therefore, the code sequence M1 always has mostly good balance between the number of factors "1" and the number of factors "−1". Note that the most balanced state is when the number of factors "1" and the number of factors "−1" are the same and a difference between them in number is zero.

Because the code sequence M1 has the seven rows and the seven columns, all of the eight drive lines cannot be driven at the same time. However, when the balance between the number of factors "1" and the number of factors "−1" in the code sequence is prioritized, there is such an option that the seven drive lines D0 to D6 are driven by the code sequence M1 at the first timing to obtain capacitance distribution corresponding to the drive lines D0 to D6, the seven drive lines D1 to D7 are then driven by the code sequence M1 at the next timing to obtain capacitance distribution corresponding to the drive lines D1 to D7, and both of the capacitance distributions are combined together to obtain capacitance distribution corresponding to the eight drive lines D0 to D7.

FIGS. 8A and 8B are diagrams illustrating an example of another drive code of the drive circuit 4.

A code sequence M8 includes K rows selected from P rows in a code sequence M7 of P rows and N columns including the factor "1" for driving the drive line from a reference potential to a power source potential (first potential) and the factor "−1" for driving the drive line from a reference potential to a ground potential (second potential) (K≤N, K≤P) and selected while keeping balance such that a difference between the number of factors "1" and the number of factors "−1" in an i-th column (1≤i≤N) in the code sequence is brought closer to zero. On the basis of the code sequence M8, the drive circuit 4 drives K drive lines D0 to D(K−1). Also in this way, the drive lines can be balanced and driven.

For example, when 16 drive lines are driven, the 16 drive lines are driven by using the code sequence M8 having 16 rows selected from the code sequence M7 of the M sequence of 64 rows and 64 columns and selected while keeping balance such that a difference between the number of factors "1" and the number of factors "−1" in an i-th column (1≤i≤N) is brought closer to zero. Thus, the drive lines can be balanced and driven.

Note that the factor "−1" may be used to drive a drive line from a potential (another reference potential) different from the above reference potential to a ground potential.

Third Embodiment

Figure 9:
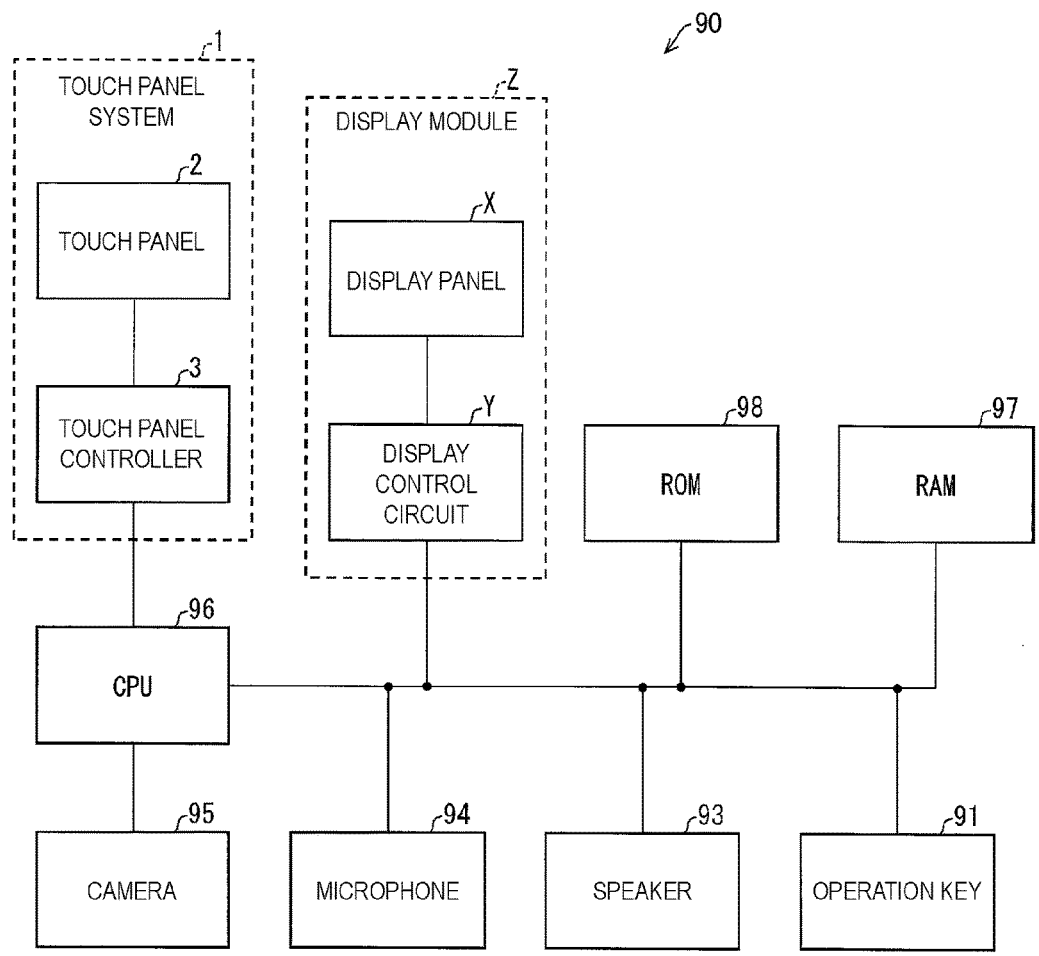
FIG. 9 is a block diagram illustrating a configuration of an electronic device according to a third embodiment.

FIG. 9 is a block diagram illustrating a configuration of a portable telephone 90 (electronic device) according to a third embodiment of the disclosure. Members having the same function as the members stated in the embodiment above are appended with the same reference signs for the sake of description, and the description thereof is omitted.

The portable telephone 90 includes a CPU 96, a RAM 97, a ROM 98, a camera 95, a microphone 94, a speaker 93, an operation key 91, a display module Z including a display panel X and a display control circuit Y, and a touch panel system 1. Each of the components is connected to one another with a data bus.

The CPU 96 controls action of the portable telephone 90. The CPU 96 executes a program stored in the ROM 98, for example. The operation key 91 receives an input of an instruction by a user of the portable telephone 90. The RAM 97 stores data generated by execution of a program by the CPU 96 or data input via the operation key 91 in a volatile manner. The ROM 98 stores data in a non-volatile manner.

The ROM 98 is a ROM that enables writing and erasing, such as an Erasable Programmable Read-Only Memory (EPROM) and a flash memory. Note that the portable telephone 90 may include an interface (IF) for connection to another electronic device with a wire, which is not illustrated in FIG. 9.

The camera 95 captures an object in response to an operation of the operation key 91 by a user. Note that image data of the captured object is stored in the RAM 97 and an external memory (for example, a memory card). The microphone 94 receives an input of a voice of a user. The portable telephone 90 digitizes the input voice (analog data). The portable telephone 90 then transmits the digitized voice to the other end of communication (for example, another portable telephone). The speaker 93 outputs a sound based on music data stored in the RAM 97, for example.

The touch panel system 1 includes a touch panel 2 and a touch panel controller 3. The CPU 96 controls action of the touch panel system 1. The CPU 96 executes a program stored in the ROM 98, for example. The RAM 97 stores data generated by execution of a program by the CPU 96 in a volatile manner. The ROM 98 stores data in a non-volatile manner.

The display panel X displays an image stored in the ROM 98 and the RAM 97 by the display control circuit Y. The display panel X overlaps the touch panel 2 or includes the touch panel 2 built therein. The touch panel system 1 may be the touch panel system 1$a$ according to the second embodiment.

Supplement

A capacitance detection method according to aspect 1 of the disclosure is a capacitance detection method for detecting a capacitance or a change in capacitance between each of a plurality of electrodes (detection electrodes E) and a detected subject, the plurality of electrodes (detection electrodes E) corresponding to intersections of a plurality of first and second signal lines (drive lines D0 to D(K−1), sense lines S0 to S(M−1)) intersecting each other. The capacitance detection method includes: a driving step of turning on a first switch element (drive switch element DT) between each of the electrodes (detection electrodes E) and at least two of the first signal lines (drive lines D0 to D(K−1)) at riving the plurality of first signal lines (drive lines D0 to D(K−1)), based on a code sequence; a reading step of turning on a second switch element (sense switch element ST) between each of the electrodes (detection electrodes E) and a corresponding second signal line (sense lines S0 to S(M−1)) and reading a linear sum signal based on an electric charge of each of the electrodes (detection electrodes E) along the second signal line (sense lines S0 to S(M−1)); and a detecting step of detecting the capacitance or a change in capacitance by an inner product calculation performed on the linear sum signal and the code sequence.

According to the configuration above, the first switch element between each of the electrodes and at least two of the first signal lines turns on and the plurality of first signal lines are driven, based on the code sequence. The second switch element between each of the electrodes and a corresponding second signal line turns on and a linear sum signal based on an electric charge of each of the electrodes is read along the second signal line. As a result, capacitance distribution between each of detection electrodes and the detected subject on a touch panel can be detected with a simple configuration.

In the capacitance detection method according to aspect 2 of the disclosure in aspect 1, a difference between a linear sum signal along one of the second signal lines (sense lines S0 to S(M−1)) and another linear sum signal along another one of the second signal lines (sense lines S0 to S(M−1)) may be read in the reading step.

According to the configuration above, the differential reading that reads a difference between the sense lines allows noise on one of the sense lines and noise on the other sense line to cancel each other by subtraction, so that the touch panel system resistant to noise can be formed.

In the capacitance detection method according to aspect 3 of the disclosure in aspect 1, a difference between a linear sum signal based on a group including the plurality of second signal lines (sense lines S0 to S(M−1)) and another linear sum signal based on another group including the other plurality of second signal lines (sense lines S0 to S(M−1)) may be read in the reading step.

According to the configuration above, the sense lines are brought together into a group and then read, so that a signal component read from the sense lines can be increased.

In the capacitance detection method according to aspect 4 of the disclosure in aspect 1, in the driving step, each of the first signal lines (drive lines D0 to D(K−1)) may be driven, based on a code sequence balanced such that a difference is brought closer to zero between the number of factors "1" for driving each of the first signal lines (drive lines D0 to D(K−1)) from a reference potential to a first potential and the number of factors "−1" for driving each of the first signal lines (drive lines D0 to D(K−1)) from the reference potential or another reference potential to a second potential in an i-th column ($1 \leq i \leq N$) in a code sequence including the factor "1" and the factor "−1".

According to the configuration above, the respective potentials for driving the plurality of drive lines can be balanced as a whole.

In the capacitance detection method according to aspect 5 of the disclosure in aspect 1, the plurality of first signal lines (drive lines D0 to D(K−1)) include K first signal lines (drive lines D0 to D(K−1)) (K is plural), and the driving step may drive the K first signal lines (drive lines D0 to D(K−1)), based on K rows selected from P rows in a code sequence of P rows and N columns including a factor "1" for driving each of the first signal lines (drive lines D0 to D(K−1)) from a reference potential to a first potential and a factor "−1" for driving each of the first signal lines (drive lines D0 to D(K−1)) from the reference potential or another reference potential to a second potential ($K \leq N$, $K \leq P$) and selected while keeping balance such that a difference between the number of factors "1" and the number of factors "−1" in an i-th column ($1 \leq i \leq N$) in the code sequence is brought closer to zero.

According to the configuration above, each potential driving the plurality of drive lines can be balanced as a whole.

A position detection method according to aspect 6 of the disclosure is a position detection method for detecting, on a touch panel 2 configured to detect a capacitance or a change in capacitance between each of a plurality of electrodes (detection electrodes E) and a detected subject, a position of the detected subject, the plurality of electrodes (detection electrodes E) corresponding to intersections of a plurality of first and second signal lines (drive lines D0 to D(K−1), sense lines S0 to S(M−1)) intersecting each other. The position detection method includes the capacitance detection method in any one of aspects 1 to 5, and a position detection step of detecting a position of the detected subject on the touch panel 2 on the basis of the capacitance or the change in capacitance detected in the detecting step.

According to the configuration above, the first switch element between each of the electrodes and at least two of the first signal lines turns on and the plurality of first signal lines are driven, based on the code sequence. The second switch element between each of the electrodes and a corresponding second signal line turns on and a linear sum signal based on an electric charge of each of the electrodes is read along the second signal line. As a result, capacitance distribution between each of detection electrodes and the detected subject on a touch panel can be detected with a simple configuration.

A touch panel controller 3, 3a according to aspect 7 of the disclosure is a touch panel controller 3 configured to control a touch panel 2 configured to detect a capacitance or a change in capacitance between each of a plurality of electrodes (detection electrodes E) and a detected subject, the plurality of electrodes (detection electrodes E) corresponding to intersections of a plurality of first and second signal lines (drive lines D0 to D(K−1), sense lines S0 to S(M−1)) intersecting each other. The touch panel controller 3 includes: a drive circuit 4 configured to turn on a first switch element (drive switch element DT) between each of the electrodes (detection electrodes E) and at least two of the first signal lines (drive lines D0 to D(K−1)) and drive the plurality of first signal lines (drive lines D0 to D(K−1)), based on a code sequence; a read circuit 5, 5a configured to turn on a second switch element (sense switch element ST) between each of the electrodes (detection electrodes E) and a corresponding second signal line (sense lines S0 to S(M−1)) and read a linear sum signal based on an electric charge of each of the electrodes (detection electrodes E) along the second signal line (sense line S0 to S(M−1)); and a detection circuit 6 configured to detect the capacitance or a change in capacitance by an inner product calculation of the linear sum signal and the code sequence.

According to the configuration above, the first switch element between each of the electrodes and at least two of the first signal lines turns on and the plurality of first signal lines are driven, based on the code sequence. The second switch element between each of the electrodes and a corresponding second signal line turns on and a linear sum signal based on an electric charge of each of the electrodes is read along the second signal line. As a result, capacitance distribution between each of detection electrodes and the detected subject on a touch panel can be detected with a simple configuration.

In the touch panel controller 3, 3a according to aspect 8 of the disclosure in aspect 7, the touch panel 2 may be provided on a display surface of a liquid crystal panel, and the plurality of electrodes (detection electrodes E) may be commonly used as common electrodes of the liquid crystal panel.

The configuration above simplifies a configuration of an in-cell liquid crystal panel in which a touch panel is installed.

An electronic device (portable telephone 90) according to aspect 9 of the disclosure includes the touch panel controller 3, 3a according to aspect 7 or 8 of the disclosure.

The disclosure is not limited to each of the embodiments stated above, and various modifications may be implemented within a range not departing from the scope of the claims. Embodiments obtained by appropriately combining technical approaches stated in each of the different embodiments also fall within the scope of the technology of the disclosure. Moreover, novel technical features may be formed by combining the technical approaches stated in each of the embodiments.

REFERENCE SIGNS LIST

1 Touch panel system
2 Touch panel
3 Touch panel controller
4 Drive circuit
5, 5a Read circuit
6 Detection circuit
7 Differential amplifier
7a Amplifier
8 Switch element control circuit
Cint Integral capacitance
D0 to D(K−1) Drive line (first signal line)
S0 to S(M−1) Sense line (second signal line)
DT Drive switch element (first switch element)
ST Sense switch element (second switch element)
E Detection electrode (electrode)

The invention claimed is:

1. A capacitance detection method for detecting a capacitance or a change in capacitance between a plurality of electrodes and a detected subject, the plurality of electrodes located corresponding to intersections of a plurality of first signal lines and a plurality of second signal lines intersecting each other, the capacitance detection method comprising:
a driving step of turning on a first switch element between each of the plurality of electrodes and at least two of the plurality of first signal lines, and driving the plurality of first signal lines, based on a code sequence;
a reading step of turning on a second switch element between each of the plurality of electrodes and a corresponding second signal line, and reading a linear sum signal based on an electric charge of each of the plurality of electrodes along the second signal line; and
a detecting step of detecting the capacitance or the change in capacitance by inner product calculation of the linear sum signal and the code sequence.

2. The capacitance detection method according to claim 1, wherein a difference between a linear sum signal along one of the plurality of second signal lines and another linear sum signal along another one of the plurality of second signal lines is read in the reading step.

3. The capacitance detection method according to claim 1, wherein a difference between a linear sum signal based on a group including some of the plurality of second signal lines and another linear sum signal based on another group including others of the plurality of second signal lines is read in the reading step.

4. The capacitance detection method according to claim 1, wherein in the driving, the plurality of first signal lines are driven, based on a code sequence balanced such that a difference is brought closer to zero between the number of factors "1" for driving the plurality of first signal lines from a reference potential to a first potential and the number of factors "−1" for driving the plurality of first signal lines from the reference potential or another reference potential to a second potential in an i-th column ($1 \leq i \leq N$), the code sequence including the factor "1" and the factor "−1".

5. The capacitance detection method according to claim 1, wherein the plurality of first signal lines include K first signal lines (K represents plural), and
the driving step drives the K first signal lines, based on K rows selected from P rows in a code sequence of P rows and N columns including a factor "1" for driving the plurality of first signal lines from a reference potential to a first potential and a factor "−1" for driving the plurality of first signal lines from the reference potential or another reference potential to a second potential ($K \leq N$, $K \leq P$) and selected while being balanced such that a difference between the number of factors "1" and the number of factors "−1" in an i-th column ($1 \leq i \leq N$) in the code sequence is brought closer to zero.

6. A position detection method for detecting, on a touch panel configured to detect a capacitance or a change in capacitance between a plurality of electrodes and a detected subject, a position of the detected subject, the plurality of electrodes located corresponding to intersections of a plurality of first signal lines and a plurality of second signal lines intersecting each other, the position detection method comprising:
the capacitance detection method according to claim 1; and
a position detection step of detecting a position of the detected subject on the touch panel, based on the capacitance or the change in capacitance that has been detected in the detecting step.

7. A touch panel controller configured to control a touch panel configured to detect a capacitance or a change in capacitance between a plurality of electrodes and a detected subject, the plurality of electrodes located corresponding to intersections of a plurality of first signal lines and a plurality of second signal lines intersecting each other, the touch panel controller comprising:
a drive circuit configured to turn on a first switch element between the plurality of electrodes and at least two of the plurality of first signal lines, and to drive the plurality of first signal lines, based on a code sequence;
a read circuit configured to turn on a second switch element between the plurality of electrodes and a corresponding second signal line, and to read a linear sum signal based on an electric charge of each of the plurality of electrodes along the second signal line; and
a detection circuit configured to detect the capacitance or the change in capacitance by inner product calculation of the linear sum signal and the code sequence.

8. The touch panel controller according to claim 7,
wherein the touch panel is provided on a display surface of a liquid crystal panel, and
the plurality of electrodes are commonly used as common electrodes of the liquid crystal panel.

9. An electronic device comprising the touch panel controller according to claim 7.

* * * * *